Aug. 9, 1932.  K. JAGSCHITZ  1,870,683
TELESCOPING GASOMETER
Filed Nov. 20, 1928   3 Sheets-Sheet 1
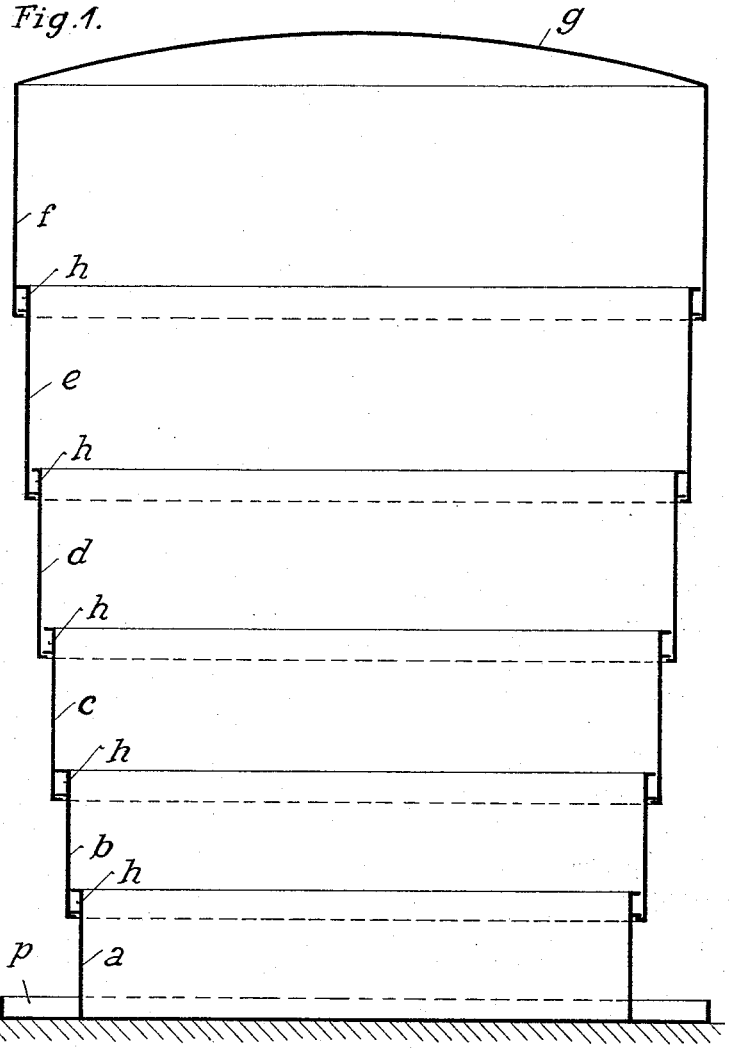
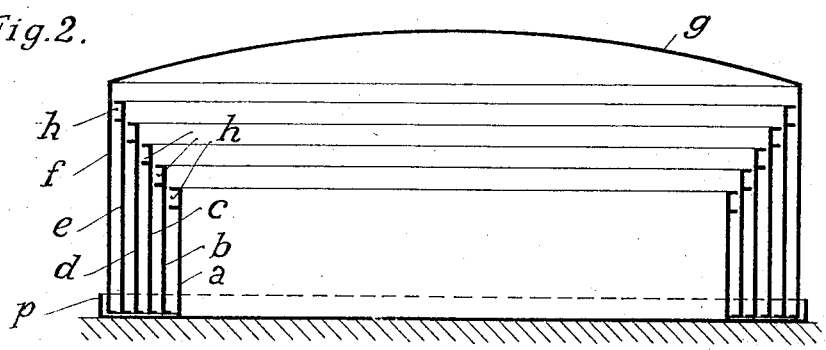
Inventor:
KONRAD JAGSCHITZ
By
Attorneys Aug. 9, 1932.  K. JAGSCHITZ  1,870,683
TELESCOPING GASOMETER
Filed Nov. 20, 1928  3 Sheets-Sheet 2

Inventor:
KONRAD JAGSCHITZ
By
Attorneys

Aug. 9, 1932.  K. JAGSCHITZ  1,870,683
TELESCOPING GASOMETER
Filed Nov. 20, 1928  3 Sheets-Sheet 3

Inventor:
KONRAD JAGSCHITZ
BY
Attorneys

Patented Aug. 9, 1932

1,870,683

UNITED STATES PATENT OFFICE

KONRAD JAGSCHITZ, OF MAINZ, GERMANY, ASSIGNOR TO MASCHINENFABRIK AUGSBURG-NURNBERG A. G., OF NUREMBERG, GERMANY, A CORPORATION OF GERMANY

TELESCOPING GASOMETER

Application filed November 20, 1928, Serial No. 320,735, and in Germany November 23, 1927.

My invention relates to gasometers and more specifically to gasometers of the telescoping type having a number of relatively movable telescoping sections, generally of circular cross-section, adapted to be extended in the direction of the gasometer axis.

It is the object of the present invention to provide a telescoping gasometer which does not employ the usual water trough seals but makes it possible to employ seals which are located wholly between the telescope sections, and in the preferred form of my invention, are protected from contact with rain, snow and foreign matter suspended in the atmosphere, and which serve to provide either vertical surface of the gasometer, but preferably the interior one, with a protective coating. In another form of my invention the seals perform the function of providing a protective coating for the gasometer without, however, being themselves completely protected from rain, snow and other foreign matter.

Figure 5:
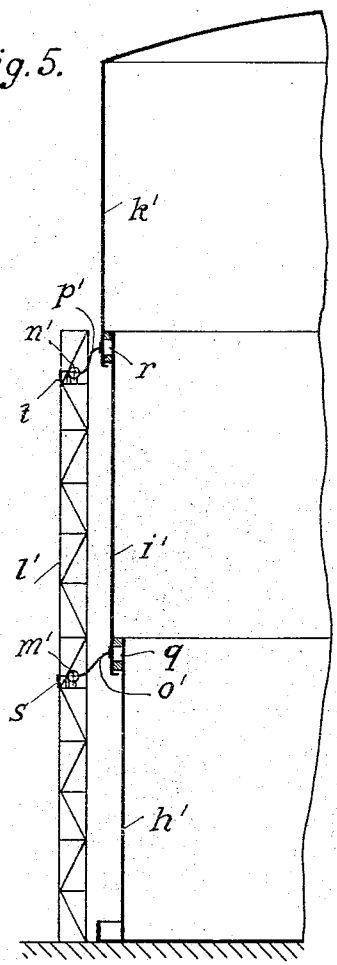
Figure 7:
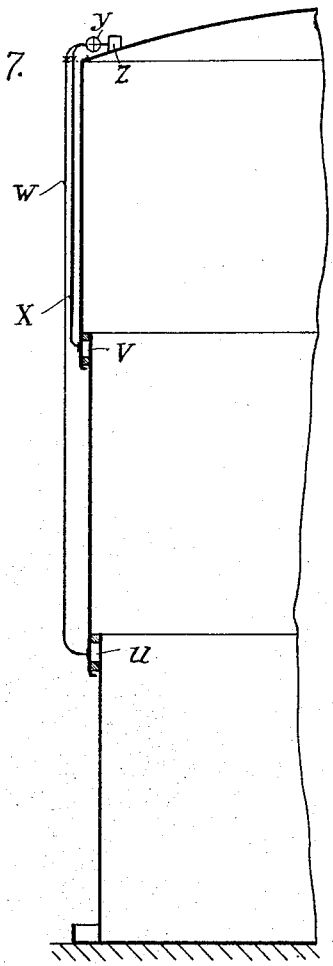
Figure 4:
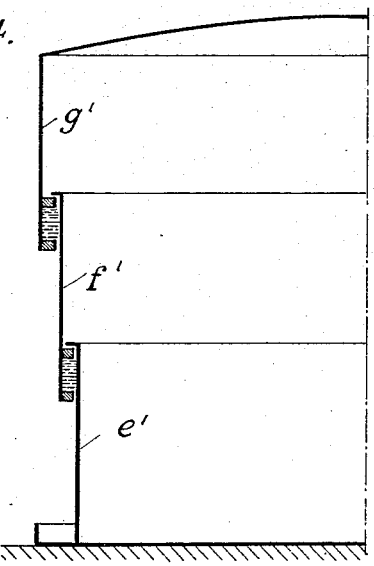
Figure 6:
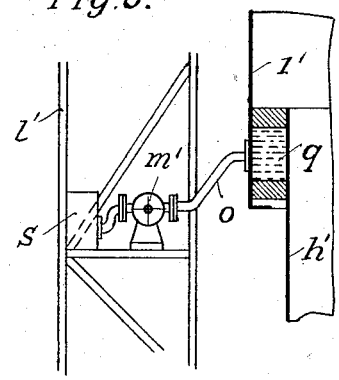
Figure 8:
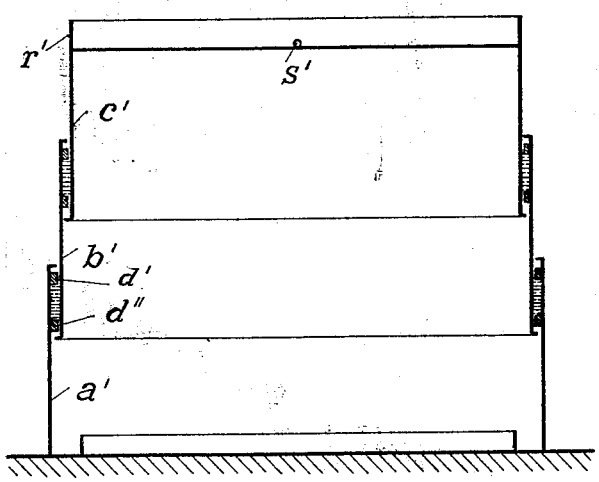
Figure 9:
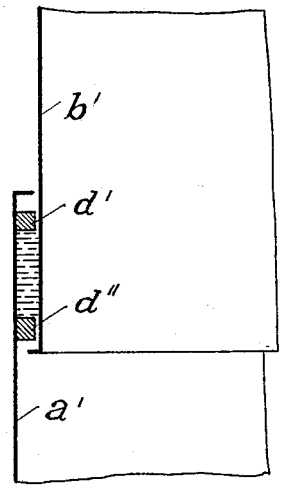

I illustrate several forms of my invention in the accompanying drawings, but it is to be understood that these embodiments are shown only by way of example and not by way of limitation. In said drawings, Fig. 1 is a diagrammatic view in vertical section of the preferred form of my improved gasometer in completely extended condition; Fig. 2 is a similar view of the same in collapsed condition; Fig. 3 is an enlarged vertical section through one form of a seal located between two adjacent telescoping sections of the gasometer; Fig. 4 is a view similar to that shown in Fig. 1 but showing a modified arrangement of the sealing elements; Figs. 5 and 7 show different arrangements for charging sealing fluid into the seals located between the movable telescoping gasometer sections; Fig. 6 shows an enlarged detail of Fig. 5; Fig. 8 is a diagrammatic vertical section of a gasometer of known type but having my novel sealing elements embodied therein; and Fig. 9 is a fragmentary enlarged view in vertical section of one of the sealing elements shown in Fig. 8.

The telescoping gasometer shown in Figs. 1 and 2 consists of six telescoping annular shell sections $a$, $b$, $c$, $d$, $e$ and $f$, but it will be clear that within reasonable limits any number of such sections may be employed. Contrary to the usual construction, wherein the several sections of a telescoping gasometer progressively decrease in diameter from the bottom to the top section, so that the top section, which carries the roof or cover of the gasometer, is the smallest in diameter, the shell sections of this form of my improved gasometer progressively increase in diameter from the lowermost section $a$ to the topmost section $f$, the latter thus being the largest in diameter. The roof $g$ is carried by the top section $f$. Each section except the topmost one carries a seal $h$ upon its exterior surface adjacent to or at its upper edge. Each seal is thus located between adjacent sections and is adapted to glide upon the inner surface of the outer one of said adjacent sections. As shown in Fig. 3, this form of my seal is composed of retaining rings $i$ and $k$ spaced vertically to provide a space $l$ which is covered or overlapped by the adjacent shell section of larger diameter, and is filled with a sealing material consisting of a more or less viscous lubricating fluid, preferably a highly viscous or semi-solid lubricating grease or other material suitable for forming a protective coating for the interior surface of the adjacent upper section. An opening ordinarily closed by a plug $m$ (Fig. 3) may be provided in each of the sections except the lowermost one, through which sealing material may be introduced into the spaces $l$, for instance, by a pump which is adapted to feed the sealing material into such spaces in the manner described below. The escape of sealing material from the spaces $l$ may be reduced if desired by positioning sealing rings, such as $n$ and $o$, in suitable grooves in the retaining rings $i$ and $k$ for instance in the manner of piston rings.

It will be apparent from Fig. 1 that no rain, snow, dust or other foreign matter from the outside can reach either the seals, which are protected by the outer sections, or the surfaces against which they glide, which face the interior of the gasometer.

The shell sections are preferably of progressively increasing heights, each increase of height being at least equal to the height of a seal, so that when the gasometer is empty and the sections are collapsed into a compact mass, as shown in Fig. 2, each of the seals will be readily accessible, for facility of inspection and repair, from the interior of the gasometer.

As the seals glide against the inner surfaces of the outer one of the adjacent shell sections, such inner surfaces, which are not accessible from the outside of the gasometer, are covered with a coating of sealing material, and thus protected against corrosion. This coating of material, being water repellant, prevents also the formation of ice upon the interior walls of the gasometer from water which may be contained in and precipitated from the stored gas.

Any lubricating or sealing material that may work its way out of the several seals may be collected in a trough $p$ arranged around the gasometer and used over again.

Fig. 4 shows a gasometer provided with the gliding type of seal shown in Figs. 1 and 3 but the seals are arranged to glide over the outside surfaces of the gasometer sections so as to coat it, protecting the same against external influences. In this gasometer the lowest section $e'$ is the innermost section and is the smallest in diameter, the upper sections $f'$ and $g'$ increasing progressively in diameter so that the uppermost section, to which the roof of the gasometer is attached, has the largest diameter and overhangs the lower sections. A seal is attached to the inner surface of the outer one of each pair of adjacent sections adjacent to or at the lower edge thereof and glides upon the outer surface of the inner section. It is to be noted that, as in the construction shown in Fig. 1, each seal communicates at its upper end with the interior of the gasometer, and is therefore protected against the infiltration of dust, rain-water, etc. from above. It is also to be noted that the construction illustrated in Fig. 4 affords easy access to the several seals from the exterior of the gasometer. The difference between the constructions shown in Figs. 1 and 4 is that in the former the inner surfaces of the section are lubricated by the sealing material, whereas in the latter the outer surfaces are so lubricated, which is of particular advantage in localities wherein furnaces, acid plants, etc. are situated which discharge acid fumes into the atmosphere.

The gasometers described above may be constructed, as the drawings indicate, without any guiding framework for the movable annular gasometer sections. They may, however, if desired, be equipped with any well-known type of framework for guiding the same radially, tangentially or both. The gasometer sections may be of any suitable construction, including the one provided with spiral guiding means known to the art. These spiral guiding means have not found favor in certain localities where climatic conditions are unfavorable, but when used in combination with the novel construction of sealing means described hereinabove, are more suitable for use in such localities because protected against injury by such conditions when coated with the sealing means.

Figs. 5, 6 and 7 illustrate two arrangements for supplying the seals with sealing material before and during the use of the gasometer. The seals illustrated in these figures are located upon the outside surface of the inner one of each pair of adjacent sections and at the upper edge thereof, as shown also in Figs. 1, 2 and 3. It will be understood, however, that the sealing material feeding means about to be described may be employed also with the seals illustrated in Fig. 4 and in Figs. 8 and 9.

Fig. 5 shows a gasometer composed of three telescoping sections $h'$, $i'$, and $k'$ having the seals $q$ and $r$ therebetween. Adjacent the gasometer and externally thereof a tower $l'$ is positioned which is preferably of such height that pumps such as $m'$ and $n'$ may be positioned thereon so as to be approximately at the level of the seals $q$ and $r$ when the sections $i'$ and $k'$ are in completely raised position, so that sealing material may be conducted into the seals by the pumps through the relatively short conduits $o'$ and $p'$. The connection of the conduits with the interior of the seals is effected through openings in the shell sections which may be closed by means of plugs after the seal has been filled. The conduits are flexible and are thus able to follow the limited movements of the sections which may occur during the filling of the seal, so that the sealing material may be charged without interrupting the use of the gasometer. The pumps are fed from reservoirs $s$ and $t$ positioned nearby on the tower $l'$, as shown more clearly in Fig. 6.

Fig. 7 shows a gasometer constructed similarly to that illustrated in Fig. 5, but the seals $u$ and $v$ thereof are fed by a single pump $y$ which may conveniently be located on the roof of the gasometer. Two relatively long conduits $w$ and $x$ conduct the sealing material from the pump to the seals, the conduits being provided with valves which may be opened when necessary to permit or check the flow of said material to either or both of the seals. The pump draws the sealing material from a container $z$ which likewise may conveniently be arranged on the roof of the gasometer. The conduit $w$ which leads to the lower seal $u$ must be flexible to allow for the relative movement between the roof of the gasometer and the seal $u$. Such flexible conduit may be composed of metal tubing or of so-called telescoping tubes which are well known and need not be shown in detail. If desired, a plurality of pumps and associated conduits may be used instead of a single pump.

While I have shown a specific type of seal in connection with my novel form of gasometer, it will be understood that other types of sliding seals may be used; such seals may employ fluid or semi-fluid sealing materials and may be constructed in any suitable manner.

However, I prefer to employ as sealing material a semi-solid, i. e. plastic material, such as lubricating grease, suitable not only for preventing escape of gas, but also as a protective coating for a surface of the gasometer, and, incidentally, as a lubricant to facilitate relative movement of the sliding sections.

Fig. 8 shows a telescoping gasometer of the usual construction wherein the several sections $a'$, $b'$ and $c'$ progressively decrease in diameter from the lowermost to the topmost section, the latter carrying the roof of the gasometer.

Between each pair of sections is provided my improved seal shown on an enlarged scale in Fig. 9 in which $d'$ and $d''$ are retaining rings between which and the walls of the two adjacent sections the sealing material is held. In this construction the movement of the gasometer units causes a coating to be applied to the outer surfaces of such moving units. In order to prevent rain-water from flowing from the roof down the side of the gasometer the roof is provided with an upstanding flange $r'$ which may be provided with an aperture $s'$ for permitting the withdrawal, through a suitable conduit, of such rain-water.

It will be noted that the sliding seals described hereinabove are so constructed and located that, with the exception, in certain instances, of the lowermost one, they may move bodily in the vertical direction as the gasometer is extended, so that each section may move for a distance much in excess of the vertical dimension of the associated seal without disturbing the operation of the latter. Gasometers built in accordance with my invention have, therefore, a range of movement which is not limited by the vertical dimension of the seal, as is the case in known gasometers of the trough seal type.

Variations from the specific forms shown and described may be resorted to within the scope of the appended claims without departing from the spirit of the invention.

I claim:

1. In a gasometer, a plurality of relatively movable telescoping gasometer sections, all of said sections except the uppermost being open at the top, so that said sections confine a continuous space for the storage of gas, and a sealing member carried between the inner wall of one section and the outer wall of the other section of each pair of adjacent sections and adapted to slide on at least one of such walls.

2. A gasometer as set forth in claim 1, wherein the gasometer sections progressively increase in diameter from the lowermost to the uppermost.

3. A gasometer as set forth in claim 1, wherein the sealing member is attached to the end of one of each pair of adjacent gasometer sections, so as to sweep the surface of the other section as the sections are extended or collapsed.

4. A gasometer as set forth in claim 1, wherein the sealing member is attached to such end of one of each pair of adjacent sections in such position that the interior wall of the other section is swept by said sealing member.

5. A gasometer as set forth in claim 1, wherein said sealing member includes a plastic material adapted to form a coating on the surface of one of the sections.

6. A gasometer as set forth in claim 1, wherein the sealing member includes spaced sealing rings attached to one of each pair of gasometer sections, and adapted to sweep the other section as the gasometer is extended or collapsed, the section to which said rings are attached being provided with an aperture giving access to the space between such rings, a conduit one end of which is attached to such outer section in registry with such aperture, a charging pump connected to the other end of said conduit, and a container attached to said pump and adapted to contain a sealing material.

7. A gasometer as set forth in claim 1, wherein the height of each section is greater than the height of the section immediately below it when the gasometer is in extended condition, by at least the height of the sealing member and each sealing member is carried at the upper end of a section.

8. A gasometer comprising a fixed lowermost section and a plurality of movable telescoping gasometer sections progressively increasing in diameter from the lowermost to the uppermost, all of said movable sections except the uppermost being open at the top, so that said sections confine a continuous space for the storage of gas, and separate sealing members for sealing adjacent gasometer sections, at least one of said members including an annular sealing element filling the gap between the associated adjacent sections and slidably bearing against one of such adjacent sections.

9. A gasometer as set forth in claim 1, wherein said sealing member comprises two spaced sealing rings attached to one of each pair of adjacent sections and forming a substantially closed space with the walls of said sections, and a plastic sealing material substantially filling said space.

Dr. KONRAD JAGSCHITZ.